United States Patent [19]

York

[11] Patent Number: 5,432,423
[45] Date of Patent: Jul. 11, 1995

[54] ELECTRONIC DAMPING SYSTEM

[75] Inventor: James E. York, Endicott, N.Y.

[73] Assignee: Universal Instruments Corporation, Binghamton, N.Y.

[21] Appl. No.: 53,689

[22] Filed: Apr. 29, 1993

[51] Int. Cl.⁶ ............................................. G05B 5/01
[52] U.S. Cl. ................................. 318/611; 318/460; 318/618; 212/272
[58] Field of Search ........ 318/114, 460, 611, 615–618, 318/592.4, 653, 623, 560, 625, 677–681; 212/222, 146; 414/222, 225, 509, 751

[56] References Cited

U.S. PATENT DOCUMENTS

| | | |
|---|---|---|
| 4,704,792 | 11/1987 | Itagaki et al. . |
| 4,710,865 | 12/1987 | Higomura ........................ 318/592 X |
| 4,810,941 | 3/1989 | Ohishi et al. ..................... 318/592 X |
| 4,823,053 | 4/1989 | McCraken et al. .............. 318/114 X |
| 4,918,364 | 4/1990 | Naito ................................. 318/460 X |
| 4,945,294 | 7/1990 | Anderson, Jr. . |
| 4,963,804 | 10/1990 | Geiger ................................... 318/460 |
| 5,002,448 | 3/1991 | Kamijima et al. . |

FOREIGN PATENT DOCUMENTS 2022745 11/1978 Germany .

OTHER PUBLICATIONS

Hewlett–Packard Application Note 243–2, "Control System Development Using Dynamic Signal Analyzers", Copyright ©1984, Hewlett–Packard Co., pp. 1 and 6–27.

Primary Examiner—David S. Martin
Attorney, Agent, or Firm—Banner & Allegretti, Ltd.

[57] ABSTRACT

An electronic damping system is disclosed which dampens mechanical resonant vibrations of a gantry beam end. The system includes a secondary velocity feedback loop in addition to the main servo motor-tach velocity loop. The resonant velocity of the beam is sensed from the movement of the end of the beam. The velocity feedback signal is summed as negative feedback with the velocity command signal from the position controller. The resultant sum of the signals are combined to form the velocity reference input command signal to a servo power amplifier. The servo power amplifier is connected to a main servo motor which controls the movement of the gantry beam in the Y-direction relative to printed circuit board.

12 Claims, 3 Drawing Sheets

ELECTRONIC DAMPING SYSTEM

FIELD OF THE INVENTION

The present invention is directed to a system for electronically damping mechanical vibrations, and more particularly, to damping the mechanical vibrations caused by acceleration and deceleration incremental motion forces of a gantry beam positioning system.

BACKGROUND OF THE INVENTION

It is known to use a circuit board assembly apparatus having at least one movable carriage, i.e., gantry beam, mounted via bearings on guide rails for movement in one direction over a printed circuit board, while at least one component gripping device is mounted on the movable carriage for movement along the carriage in another direction. This device allows x-y positioning of electronic components held in the gripping device relative to a printed circuit board. Such an assembly is shown, for example, in U.S. Pat. No. 5,002,448, the contents of which are incorporated herein by reference.

The gantry beam is driven by a servo control system. To optimize manufacturing efficiency when mounting components on printed circuit boards, it is desirable to position the components as quickly as possible relative to the circuit board. However, such high speed operation produces undesirable vibrations, oscillations, resonances and the like in the gantry beam.

A particular problem is caused by the fact that the natural resonance frequencies of the gantry beam end change as the gantry beam load changes as the gripping device carried by the movable carriage traverses the beam. Thus, traditional systems for compensating for resonances, such as electronic notch filtering, would be very difficult to use in a gantry beam positioning system since the notch frequency setting would have to vary with the position of the load along the beam.

SUMMARY OF THE INVENTION

The present invention overcomes the above difficulties by creating a secondary velocity feedback loop for the main servo motor-tach velocity loop in which the resonance velocity of the beam is sensed from the movement of the end of the beam. The resonance velocity feedback signal is summed as negative feedback with the velocity command signal from the position controller. The resultant sum of the signals are combined to form the velocity reference input command signal to a servo power amplifier. This secondary velocity feedback loop is supplemental to the main servo motor-tach velocity loop in the servo power amplifier.

The amount of secondary loop gain can be adjusted according to the optimum mechanical settling time required to produce high speed and high accuracy placement of components on printed circuit boards. Decreasing mechanical settling time in accordance with the invention ensures machine part placement repeatability and increased placement speed.

BRIEF DESCRIPTION OF THE DRAWINGS

The above aspects of the invention are apparent from the accompanying drawings in which.

DETAILED DESCRIPTION OF THE PREFERRED EMBODIMENTS

Figure 1:
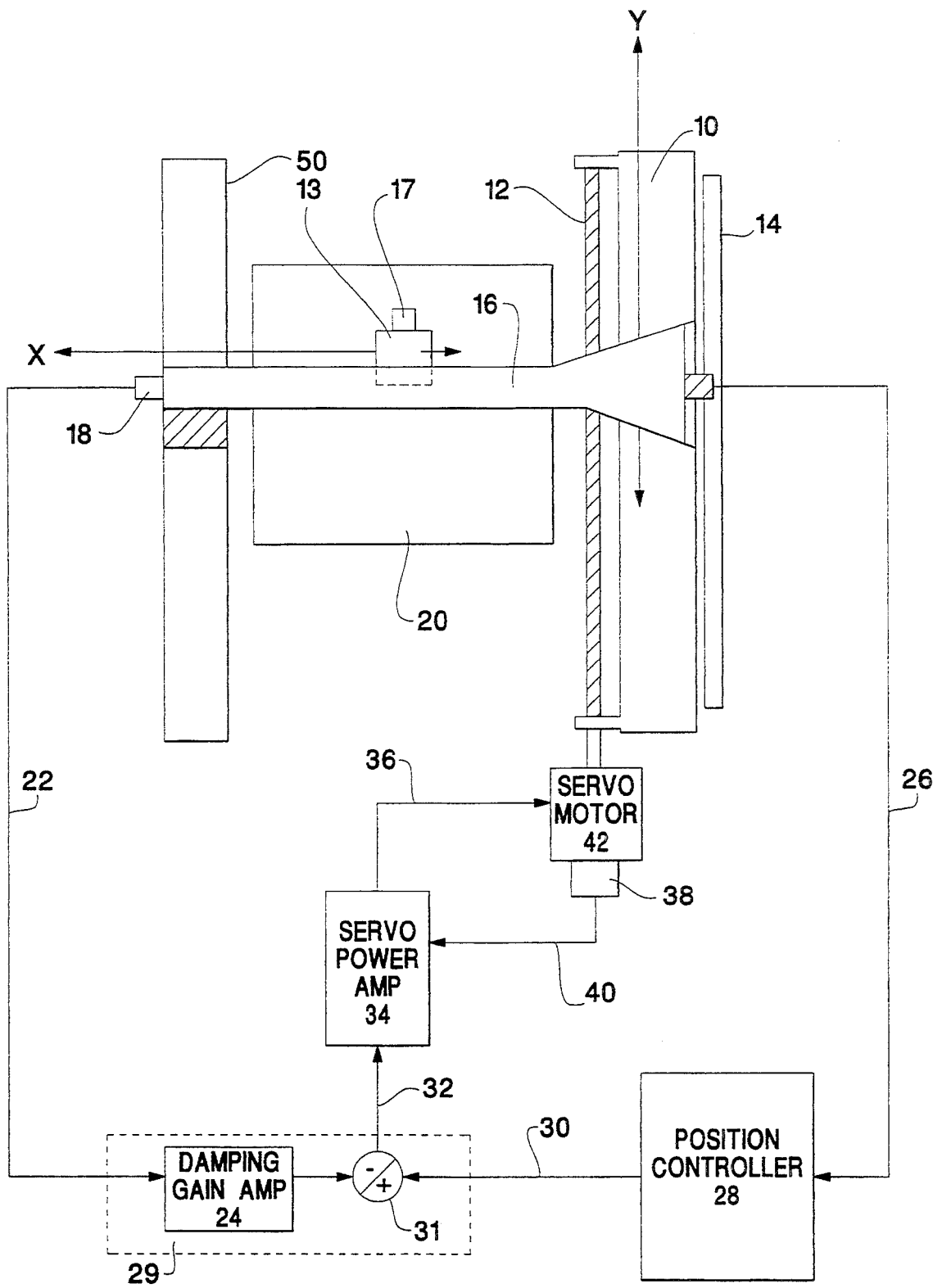
FIG. 1 is a schematic block diagram of a preferred embodiment of the system in accordance with the present invention.

A gantry beam electronic damping system in accordance with the present invention is shown in FIG. 1. Throughout the figures, like numerals are used to represent like elements.

The system includes a gantry beam 16 supported for controlled movement in the Y-direction between linear bearing supports 10 and 50 over a printed circuit board 20. Ball or feed screw 12 and linear scale 14 coupled to the support 10 act as a mechanical rotary to linear velocity linkage converter for controlling the movement of the gantry beam in the Y-direction. At least one component placement device or gripping device 17 is mounted for controlled movement in the X-direction along the length of gantry beam 16 by carriage 13.

Rotary tachometer 18 is disposed at the end of the gantry beam 16. Beam velocity feedback signal 22 is output from the rotary tachometer 18 via damping gain amp 24 to summing junction 31. Together, damping gain amp 24 and summing junction 31 form adjustable combining means 29.

A position feedback signal 26 is output from linear scale 14 to the position controller 28, and a velocity command signal is output from the position controller to summing junction 31. The velocity resonant signal is summed as negative feedback with the velocity command signal and the resultant sum of the signals form velocity reference input command signal 32 which is input to servo power amp 34. This forms the secondary loop supplemental to the main servo motor-tach velocity loop. Servo power amp 34 drives servo motor 42, which in turn drives ball screw 12 to damp the vibrations of the beam, in a manner which will be described in greater detail below.

Figure 2:
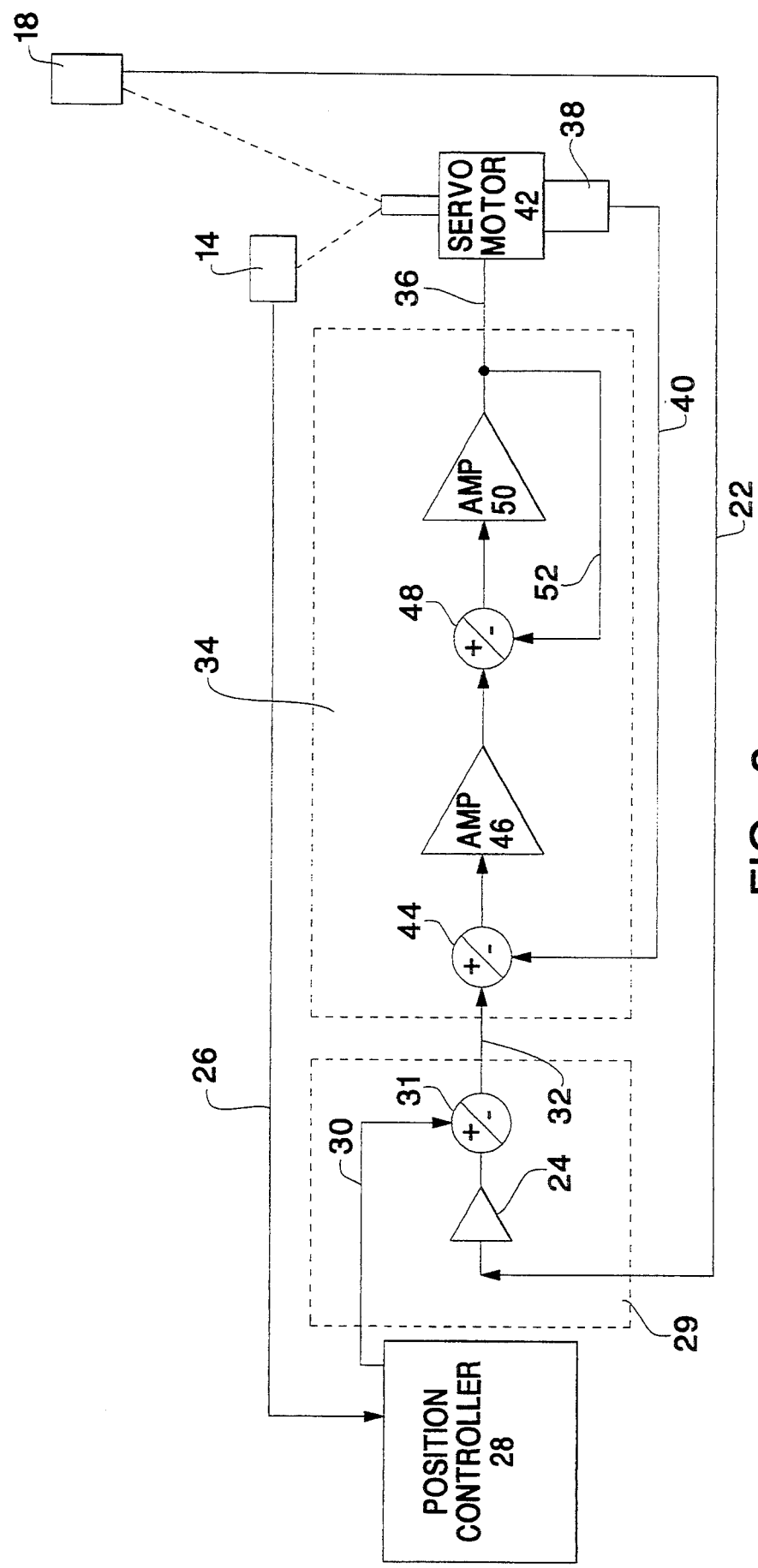
FIG. 2 is a schematic control loop diagram in accordance with the invention shown in FIG. 1.

As shown in the control loop diagram in FIG. 2, servo power amp 34 includes summing junction 44 which receives the tach feedback signal 40 from tachometer 38 coupled to servo motor 42. The tach feedback signal 40 and the velocity reference input command signal 32 are summed at summing junction 44, and the resulting signal is input to velocity loop error amplifier 46. The signal output from velocity loop error amplifier 46 and the current feedback signal 52 are summed at summing junction 48 and output to current loop error amplifier 50. The resultant drive signal 36 is output to servo motor 42. The amount of secondary loop gain is adjusted at damping gain amp 24 according to the optimum settling time requirements.

Figure 3A:
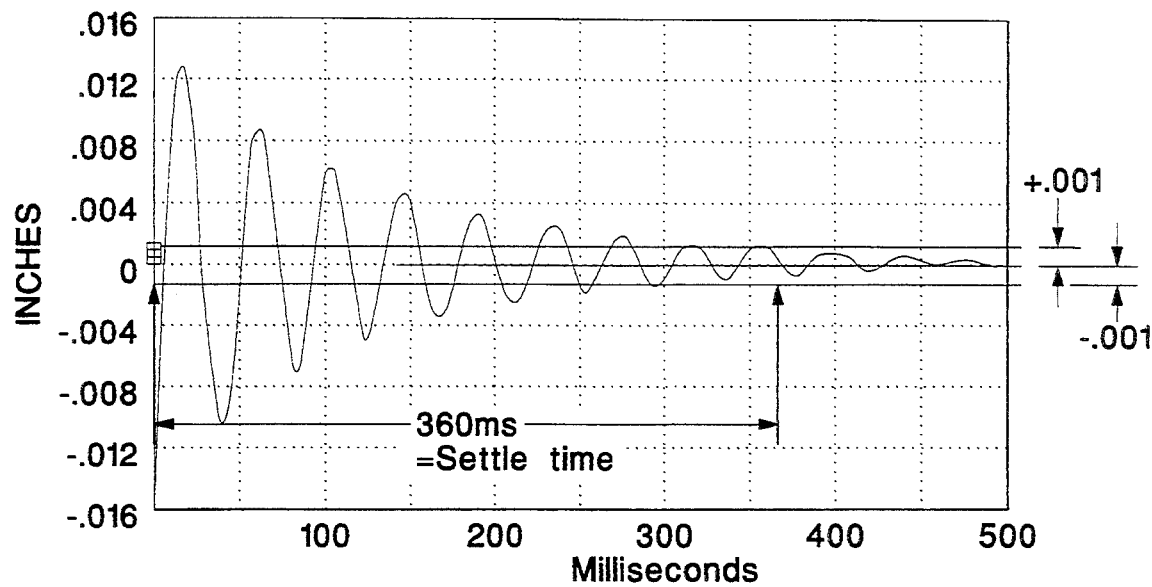
FIG. 3A is a graphical representation of an experiment showing settle time of mechanical damping without electronic damping in accordance with the present invention.
Figure 3B:
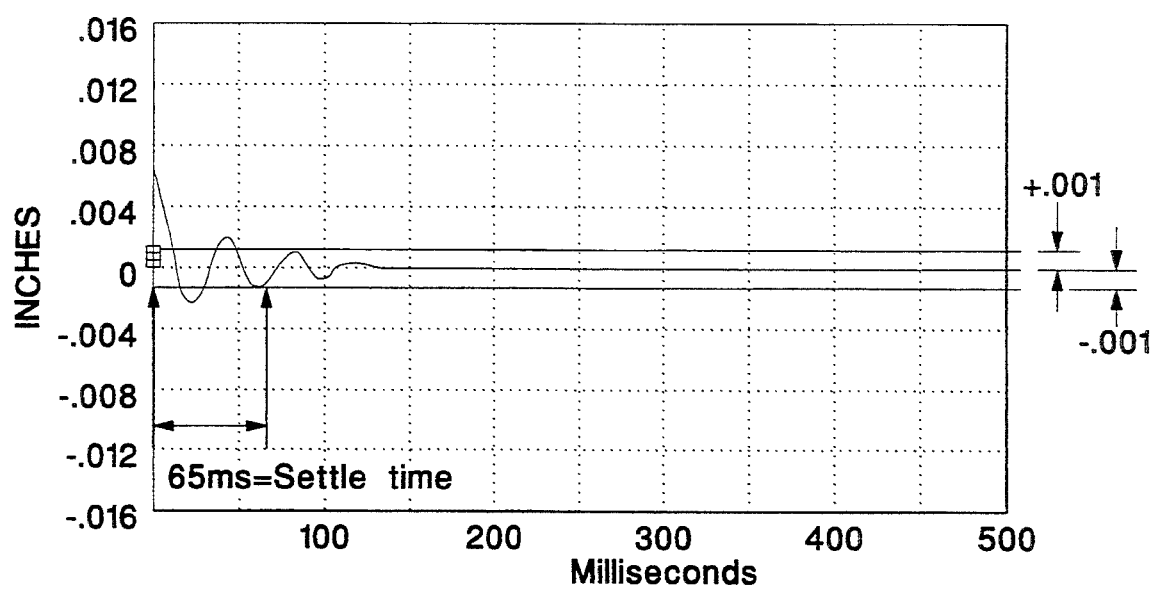
FIG. 3B is a graphical representation of an experiment showing the reduced settle time of mechanical damping with electronic damping in accordance with the present invention.

FIGS. 3A and 3B demonstrate the reduced settle time obtained using gantry beam electronic damping in accordance with the present invention. Experiments were conducted for a Y-axis displacement at 0.9 g's acceleration/deceleration and a selected carriage position. For purposes of the experiment, +−0.001 inches around the commanded position destination, the Y-axis was considered to be "settled". Settling time data was taken after the position controller signalled "reference trajectory completed". With no electronic damping, as shown in FIG. 3A, the mechanical settle time was 360 ms. measured with a similar linear scale 14 mounted at end of gantry beam 16 opposite lead screw 12. With electronic damping in accordance with the present invention switched on, the mechanical settle time was 65 ms.

The above is for illustrative purposes only. Changes can be made in accordance with the invention as defined in the appended claims. For example, the invention is not limited to the electronic damping of mechanical vibrations in a gantry beam, but may be used to dampen other elements which are subject to undesirable mechanical vibrations, oscillations or the like. Further, the invention is in no way limited for use with machines for mounting electronic components on circuit boards, but may be used in any environment in which undesirable vibrations occur.

For further example, it is also contemplated that the system may include a linear scale feedback device mounted at the end of the beam. A position controller can digitally derive the resonant velocity of the gantry beam end from change in position over change in time, and perform the function of gain amp 24 and summing junction 31 via software. The resultant signal, i.e., the velocity reference command signal 32 is then input to the servo power amp 34 as discussed above.

I claim:

1. An electronic damping system for damping mechanical vibrations of a gantry beam in a gantry beam positioning system having a primary servo gain loop for controlling a servomotor for positioning the beam, said system comprising:
    velocity detecting means for detecting the resonant velocity of the gantry beam and outputting a velocity feedback signal;
    position detecting means for detecting the position of the gantry beam and outputting a position feedback signal;
    means for adjustably combining the resonant velocity feedback signal received from said velocity detecting means and the position feedback signal received from the position detecting means so as to form a secondary servo gain loop, wherein the resultant signal forms a velocity reference input command signal input to a signal power amplifier of the primary servo gain loop, whereby an optimum settling time of the gantry beam can be achieved by selecting an appropriate gain for the secondary servo gain loop.

2. An electronic damping system as in claim 1, wherein said resonant velocity detecting means is a tachometer.

3. An electronic damping system as in claim 1, wherein said position detecting means is a linear scale.

4. An electronic damping system as in claim 1, wherein said gantry beam is accelerated and decelerated by motion forces imparted by a ball screw driven by a servo motor controlled by said signal power amplifier.

5. An electronic damping system as in claim 4, wherein said means for adjustably combining includes a damping gain amplifier and a first summing junction.

6. An electronic damping system as in claim 5, wherein a tach feedback signal from a tachometer coupled to said servo motor and said velocity reference input command signal are summed at a second summing junction, and the resulting signal is input to a velocity loop error amplifier, and the signal output from said velocity loop error amplifier and a current feedback signal are summed at a third summing junction and output to a current loop error amplifier.

7. An electronic damping system as in claim 1, further comprising drive means coupled to said servomotor for driving said gantry beam, said drive means being disposed at an end of the gantry beam opposite said velocity detecting means.

8. An electronic damping system as in claim 7, wherein said position detecting means is disposed at the same end of said gantry beam as said drive means.

9. An electronic gantry beam damping system having a primary servo gain loop for controlling a servomotor for positioning the beam, said system comprising:
    primary servo positioning means for positioning a component placement device mounted to a gantry beam carriage relative to a printed circuit board; and
    damping means for damping vibrations in the gantry beam, said damping means including
    (a) position detecting means for detecting the position of the gantry beam and outputting a position feedback signal;
    (b) resonant velocity sensing means for detecting the velocity of the gantry beam end and outputting a velocity feedback signal;
    (c) adjustable amplifier means for applying a desired amount of gain to the resonant velocity feedback signal received from said velocity detecting means and outputting an amplified velocity feedback signal; and
    (d) means for combining the position feedback signal received from said position detecting means and the amplified velocity feedback signal frown said adjustable amplifier means to form a secondary servo control loop, the resultant signal output from said means for combining being applied to a servo power amplifier of the primary servo gain loop of said primary servo positioning means, wherein the desired amount of gain is predetermined to provide an optimum settling time for the gantry beam.

10. A gantry beam electronic damping system as in claim 9, wherein said resonant velocity detecting means is a rotary tachometer.

11. A gantry beam electronic damping system as in claim 9, wherein said position detecting means is a linear scale.

12. A gantry beam electronic damping system as in claim 9, wherein said servo power amplifier drives a servo motor coupled via a feed screw to control the movement of the gantry beam.

* * * * *